(12) United States Patent
Noh et al.

(10) Patent No.: US 7,256,925 B2
(45) Date of Patent: Aug. 14, 2007

(54) FLEXIBLE ELECTROCHROMIC DEVICE AND METHOD OF MANUFACTURING THE SAME

(75) Inventors: Chang ho Noh, Suwon-si (KR); Sung Hen Cho, Seoul (KR); Ki Yong Song, Seoul (KR); Jin Young Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/483,443

(22) Filed: Jul. 10, 2006

(65) Prior Publication Data

US 2007/0153357 A1 Jul. 5, 2007

(30) Foreign Application Priority Data

Dec. 29, 2005 (KR) .................. 10-2005-0133664

(51) Int. Cl.
*G02F 1/15* (2006.01)
(52) U.S. Cl. ...................... 359/265; 359/273
(58) Field of Classification Search ......... 359/265–275
See application file for complete search history.

(56) References Cited

U.S. PATENT DOCUMENTS 6,067,184 A * 5/2000 Bonhote et al. ............ 359/265

6,870,657 B1 3/2005 Fitzmaurice et al. ........ 359/273
2005/0104136 A1 * 5/2005 Edwards et al. ............ 257/400

FOREIGN PATENT DOCUMENTS

| JP | 2002-100416 | 4/2002 |
| WO | WO 97/35227 | 9/1997 |
| WO | WO 98/35267 | 8/1998 |

OTHER PUBLICATIONS

All the references cited in the Search Report are listed above.

* cited by examiner

*Primary Examiner*—Evelyn A. Lester
(74) *Attorney, Agent, or Firm*—Cantor Colburn LLP

(57) ABSTRACT

A flexible electrochromic device including a flexible transparent electrode including a predetermined pattern, an insulating layer formed on a portion of the transparent electrode other than the predetermined pattern, a semiconductor layer formed on the predetermined pattern, an electrochromic monolayer formed on the semiconductor layer, a flexible counter electrode disposed to face the transparent electrode and an electrolyte provided in a space between the transparent electrode and the counter electrode.

20 Claims, 2 Drawing Sheets

FLEXIBLE ELECTROCHROMIC DEVICE AND METHOD OF MANUFACTURING THE SAME

This application claims priority to Korean Patent Application No. 2005-133,664 filed on Dec. 29, 2005 and all the benefits accruing therefrom under 35 U.S.C. §119, the contents of which are herein incorporated by reference in its entirety.

BACKGROUND OF THE INVENTION

1. Field of the Invention

The present invention relates to a flexible electrochromic device and a method of manufacturing the same, and more particularly, to a flexible electrochromic device, which includes a patterned insulating layer, a nanocrystalline semiconductor layer adsorbed on a predetermined pattern and an electrochromic material layer improving contrast and operational properties of a display device, and to a method of manufacturing such an electrochromic device.

2. Description of the Related Art

An electrochromic device is a device that can exhibit a visual chromism effect through chemical or physical transformation of the molecular structure of electrochromic material caused by various external stimuli including electrical stimulus. Such a device is based on the principle of inducing visual change in color or shade due to a redox reaction. The redox reaction is caused by the transfer of ions or electrons contained in the electrolyte supplied between a transparent electrode and a counter electrode into an electrochromic material layer upon the generation of potential difference between the two electrodes by external electrical stimulus. The electrochromic device can control the optical properties and thus can be used for information treatment, such as the recording, display and output of information data.

In regard to the electrochromic device, WO97/035227 discloses a nano electrochromic display, in which electrical active material such as viologen is adsorbed on a nanocrystalline semiconductor material. In addition, WO98/035267 and U.S. Pat. No. 6,870,657 disclose an electrochromic device including semiconductive metal oxide having an adsorbed redox chromophore. However, since the nanocrystalline semiconductor material should be formed at high temperatures of 450° C. or more in order to exhibit desired properties, it is difficult to apply on a flexible transparent substrate.

The flexible nanocrystalline electrochromic device, which is a display device using a flexible transparent substrate such as plastic, is receiving attention in terms of having wide application fields by virtue of the flexible properties thereof. However, in the case where the flexible substrate is used, a process of forming metal oxide such as $TiO_2$, which is the main constituent of the semiconductor electrode, should be conducted at low temperatures of 200° C. or less, and thus, high reliability of $TiO_2$ cannot be assured, undesirably exhibiting insufficient display performance.

In addition, Japanese Patent Laid-open Publication No. 2002-100416 discloses a photoelectric conversion device manufactured by attaching a semiconductor particle layer to the surface of the conductive layer of a conductive support via electrophoretic deposition.

However, such techniques suffer because they do not include a process of forming a nanocrystalline pattern on a flexible substrate, and achieving low contrast and long response time.

BRIEF SUMMARY OF THE INVENTION

In exemplary embodiments, a flexible electrochromic device, includes an insulating layer printed on a portion other than a predetermined pattern on a display device and a semiconductor layer formed via electrophoretic deposition and then compression, thus improving the operational properties thereof.

In exemplary embodiments, a method of manufacturing a flexible electrochromic device includes using a printing process and an electrophoretic deposition process.

Exemplary embodiments, provide a flexible electrochromic device including a flexible transparent electrode including a predetermined pattern, an insulating layer formed on a portion other than the predetermined pattern, a semiconductor layer formed on the predetermined pattern of the transparent, an electrochromic monolayer formed on the semiconductor layer, a flexible counter electrode disposed to face the transparent electrode, and an electrolyte provided in a space between the transparent electrode and the counter electrode.

Exemplary embodiments provide a method of manufacturing a flexible electrochromic device, the method including forming a transparent electrode including a predetermined pattern, forming an insulating layer on a portion other than the predetermined pattern to expose the predetermined pattern, forming a semiconductor layer on the exposed predetermined pattern; compressing the semiconductor layer, forming an electrochromic monolayer on the semiconductor layer, forming a counter electrode to face the transparent electrode and providing an electrolyte between the transparent electrode and the counter electrode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
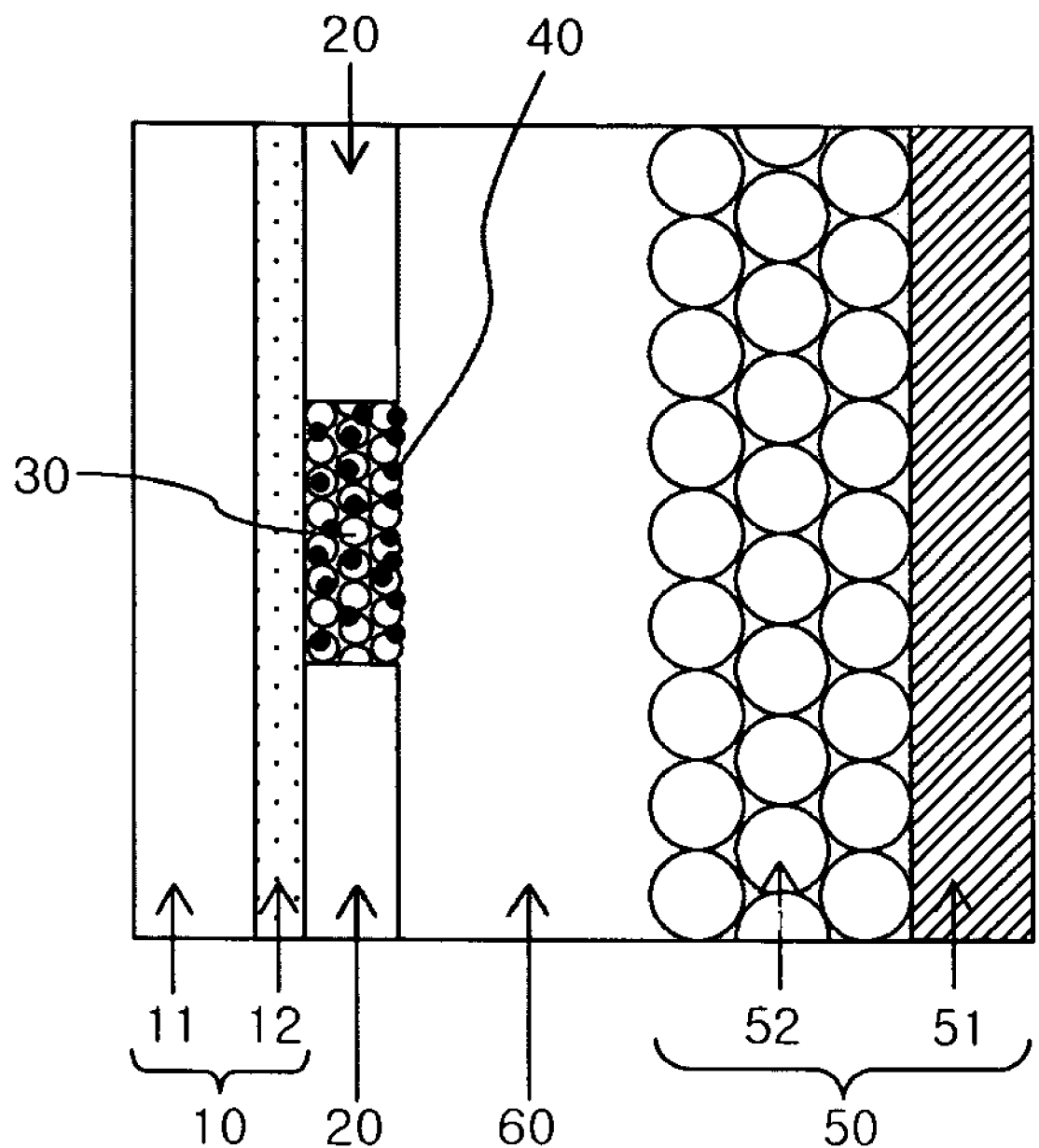
FIG. 1 is a schematic cross-sectional view showing an exemplary embodiment of an electrochromic device of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a detailed description will be given of the present invention, with reference to the appended drawings.

FIG. 1 is a schematic cross-sectional view showing an exemplary embodiment of the electrochromic device of the present invention.

As shown in this drawing, an electrochromic device includes a transparent electrode 10, an insulating layer 20 formed on the transparent electrode 10, a nanocrystalline semiconductor layer 30 formed on the transparent electrode 10, an electrochromic layer 40 formed on the semiconductor layer 30, a counter electrode 50 disposed to face the transparent electrode 10 and an electrolyte 60 provided in the space between the transparent electrode 10 and the counter electrode 50.

The transparent electrode 10 and the counter electrode 50 may include a flexible transparent electrode 10 and a flexible counter electrode 50. A predetermined pattern is formed on the transparent electrode 10. The insulating layer 20 is formed on a portion of the transparent electrode other than where the predetermined pattern is disposed. The electrochromic layer 40 may include a monolayer structure. In exemplary embodiments, the semiconductor layer may be formed using a electrophoretic deposition method.

In exemplary embodiments, the flexible transparent electrode 10 may include a substrate 11 and a conductive material 12 disposed thereon. The substrate 11 and the conductive material 12 may include a transparent material. In one exemplary embodiment, the substrate 11 is a transparent plastic substrate.

The substrate 11 may be of any of a number of materials, so long as it is suitable for use in a flexible display device and is transparent. In exemplary embodiments, the substrate may be formed using a polymeric material, such as polyethylene terephthalate (PET), polyethylene naphthalate (PEN), polycarbonate, polystyrene, polyacryl, polyether sulfone (PES), etc. In exemplary embodiments, the transparent conductive material 12 may include, but is not limited to, transparent conductive polymer materials, such as indium tin oxide (ITO), fluorine-doped tin oxide (FTO), $ZnO$—$Ga_2O_3$, $ZnO$—$Al_2O_3$, $SnO_2$—$Sb_2O_3$, and polythiophene.

The insulating layer 20 is formed on portions other than areas including the predetermined pattern on the transparent electrode such that the predetermined pattern is formed on the transparent electrode 10. In an exemplary embodiment, the insulating layer 20 may be formed by printing a negative type photosensitive insulating film so as to form a semiconductor layer on the predetermined pattern of the display device using electrophoretic deposition. The photosensitive insulating film may be formed of material insoluble in the solvent used for electrophoretic deposition and the electrolytic solution. In addition, the insulating layer may be formed of transparent insulating material so as to avoid decreasing the light transmittance of the transparent electrode.

In exemplary embodiments, the insulating layer 20 may include, but is not limited to, materials containing a photocurable material having two or more functional groups as well as a photoinitiator as an acrylic compound in order to be insoluble in the solvent after UV curing. In alternative exemplary embodiments, the insulating layer may be formed using a polymer solution through a printing process, such as screen printing, instead of using the photosensitive organic insulating film. However, the use of the transparent photosensitive organic insulating film may be better suited in view of resolution of the pattern and transparency of the film.

In exemplary embodiments, as the transparent photosensitive organic insulating film, a photosensitive spacer material may be used. In this case, the photocuring density may be controlled for the prevention of reaction with the electrolyte.

The insulating layer 20 functions to reduce, or essentially prevent, direct contact between the transparent electrode 10 and the electrolyte 60 so as to increase the operational properties of the electrochromic device. In exemplary embodiments where a portion of the transparent electrode on which the display pattern is not formed is exposed to the electrolyte, a side reaction may be caused by coupling externally injected electrons of the transparent electrode with cations oxidized in the counter electrode, thereby deteriorating the operational properties of the display device. However, in exemplary embodiments the insulating layer is formed on portions other than the predetermined pattern on the transparent electrode to reduce, or effectively prevent, direct contact between the transparent electrode and the electrolyte (which may result in unacceptable side reactions such as the recombination of electrons transferred to the transparent electrode with the redox couple in the electrolyte).

The semiconductor layer 30 is formed on the predetermined pattern of the transparent electrode 10. In exemplary embodiments, the semiconductor layer 30 may be formed at room temperature using electrophoretic deposition. In exemplary embodiments, a metal oxide used for the formation of the semiconductor layer may include, but is not limited to, titanium oxide, zirconium oxide, strontium oxide, niobium oxide, hafnium oxide, indium oxide, tin oxide, and zinc oxide. These metal oxides may be used alone or in combination. In one exemplary embodiment, titanium oxide ($TiO_2$) may be used. As the size of the metal oxide particles of the semiconductor layer decreases and the porosity thereof increases, the efficiency of the device may be increased. In exemplary embodiments, the metal oxide particles have a size of about 5 nanometers (nm) to about 30 nm.

In exemplary embodiments, the metal oxide is adsorbed on the exposed predetermined pattern of the transparent electrode through electrophoretic deposition. In one exemplary embodiment, the electrophoretic deposition is conducted at a voltage of about 100 volts (V) to about 300 V or in an electric field of about 50 V/cm to about 200 V/cm for approximately 1 to 10 minutes (min). The metal oxide thus adsorbed may be compressed so as to increase its crystal density, thereby further improving the properties of the display device. In one exemplary embodiment, the semiconductor layer is compressed at a pressure of about 500 to about 5000 $kg_f/cm^2$.

The electrochromic monolayer 40 is formed on the nanocrystalline semiconductor layer 30. The electrochromic monolayer 40 may manifest a chromism effect in a manner such that an n-type electrochromic material is adsorbed on the surface of the semiconductor layer and thus receives electrons moving from the semiconductor layer so as to induce the transformation of the molecular structure thereof. Any of a number of electrochromic materials may be used as is suitable for the purpose described herein. In one exemplary embodiment, a viologen compound is preferable.

The flexible counter electrode 50 is disposed to be opposite (facing) the transparent electrode 10. In exemplary embodiments, the counter electrode 50 may be formed of any conductive material suitable for the purpose described herein and may further include a second conductive material in order to further increase work function. The counter electrode 50 may also include an insulating material having a conductive layer that is disposed facing the transparent electrode 10. The counter electrode 50 may be formed of electrochemically stable material, such as platinum, gold, or carbon.

In exemplary embodiments, on the counter electrode 50, a redox material or a p-type electrochromic material that is oxidized upon reduction of the n-type electrochromic material on the transparent electrode, so as to maintain an electrically neutral state, may be adsorbed. The p-type electrochromic material may be contained in the electrolyte or may be formed on both the electrolyte and the counter electrode 50.

In exemplary embodiments, to efficiently adsorb the p-type electrochromic material or redox material on the counter electrode 50, a surface of the counter electrode 50 that faces the transparent electrode 10 may include a fine structure and therefore an increased surface area. The electrochromic material or redox material may include, but is not limited to, titanium oxide, zirconium oxide, strontium oxide, niobium oxide, hafnium oxide, indium oxide, tin oxide, and zinc oxide, which are nanocrystals, used alone or in combination. These oxides may be doped with arsenic (As), fluorine (F), etc. In one exemplary embodiment, nanocrystalline titanium oxide ($TiO_2$) or As-doped $SnO_2$ may be used.

As the size of the metal oxide particles of the semiconductor layer decreases and the porosity thereof increases, the efficiency of the device may be improved. In exemplary embodiments, such metal oxide preferably has a particle size of about 5 nm to about 30 nm. The p-type electrochromic material or redox material used in the counter electrode may include, but is not limited to, Prussian blue, ferrocene compound derivatives, phenothiazine compound derivatives, etc.

The counter electrode 50 includes a metal foil 51. The metal foil may include stainless steel, nickel, titanium or any of a number of other materials as is suitable for a flexible film type electrochromic device and the purpose described herein. A reflective plate 52 is further formed on the metal foil 51 in order to scatter light passed through the transparent electrode, thus increasing the contrast of the semiconductor layer 30. A conductive layer may be disposed between the metal foil 51 and the reflective plate 52. The reflective plate 52 may include, but is not limited to, titanium oxide, zirconium oxide, strontium oxide, niobium oxide, hafnium oxide, indium oxide, tin oxide, or zinc oxide. These metal oxides may be used alone or in combination. In one exemplary embodiment, the metal oxide of the reflective plate 52 has a particle size of about 100 nm to about 500 nm.

The electrolyte 60 may be supplied in liquid, molten salt, or solid form, and/or may include at least one electrochemically inert salt. In exemplary embodiments, the electrolyte may be composed of lithium salt. The lithium salt may be selected from among $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where x and y are each a natural number), LiCl, LiI, and mixtures thereof, by being dissolved in a solvent, such as propylene carbonate, ethylene carbonate, diethyl carbonate, ethyl methyl carbonate, methyl propyl carbonate, butylene carbonate, benzonitrile, acetonitrile, tetrahydrofuran, 2-methyltetrahydrofuran, y-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylethylcarbonate, diethylcarbonate, methylpropylcarbonate, methyl isopropyl carbonate, ethyl propyl carbonate, dipropyl carbonate, dibutyl carbonate, diethyleneglycol or dimethylether; an imidazolium-based molten salt, such as trialkylimidazolium; or mixtures thereof. In exemplary embodiments, the inert salt, such as lithium salt, may be present in the electrolyte in a concentration of about 0.01 M to about 1.0 M. In one exemplary embodiment the inert salt is present in the electrolyte in a concentration of about 0.05 M to about 0.2 M. In addition, as the redox material, a ferrocene compound or a phenothiazine compound may be present in the electrolyte in a concentration of about 0.01 M to about 0.2 M.

In another exemplary embodiment, the present invention provides a method of manufacturing a flexible electrochromic device. The method includes forming an insulating layer on a portion other than a predetermined pattern on a transparent electrode to expose the predetermined pattern, forming a semiconductor layer on the exposed predetermined pattern, compressing the semiconductor layer, forming an electrochromic monolayer on the semiconductor layer, forming a counter electrode to face the transparent electrode and supplying an electrolyte between the transparent electrode and the counter electrode. In one exemplary embodiment, the semiconductor layer may be formed via electrophoretic deposition.

FIGS. 2A-2E schematically show an exemplary embodiment of a process of sequentially forming an insulating layer, a semiconductor layer and an electrochromic monolayer on a transparent electrode, according to the present invention.

Figure 2A:
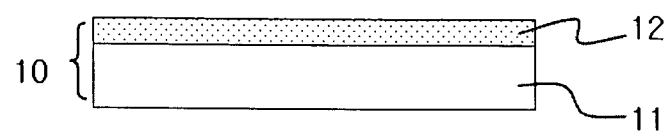
FIGS. 2A-2E are schematic cross-sectional views showing an exemplary embodiment of sequential formation of an insulating layer, a semiconductor layer, and an electrochromic monolayer on a transparent electrode, according to the present invention.
Figure 2B:
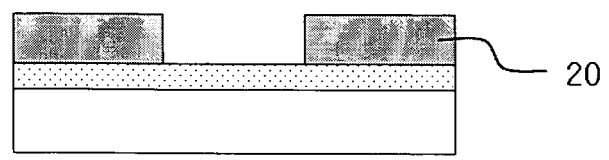

Referring to FIGS. 2A and 2B, as the process of forming the insulating layer 20 on the portion other than the predetermined pattern on the transparent electrode 10 so as to expose the predetermined pattern, a film coating process such as using a negative type transparent photosensitive insulating film may be adopted. This process enables the subsequent formation of the semiconductor layer 30 on the predetermined pattern through electrophoretic deposition. The transparent photosensitive insulating film should be formed of material that is insoluble to the solvent used for electrophoretic deposition of the semiconductor layer and the electrolytic solution.

Figure 2C:
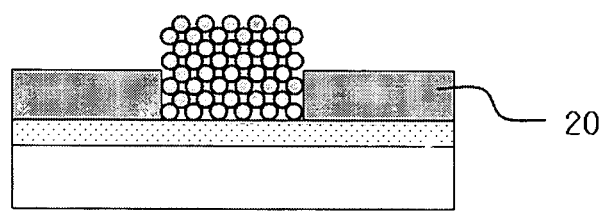

Referring to FIG. 2C, the semiconductor layer 30 is formed on the exposed predetermined pattern through electrophoretic deposition. In one exemplary embodiment the surfaces of the metal oxide particles for use in the formation of the semiconductor layer 30 may be treated with cations to be in an ion state such that such particles are attached to the surface of the transparent electrode 10 upon electrophoretic deposition. Any of a number of processes of forming the metal oxide particles into an ion state may be used such as is suitable for the purpose described herein. In exemplary embodiments, the metal oxide particles are dispersed in deionized water and/or organic solvent containing $Mg(NO_2)_2 \cdot H_2O$ for a predetermined period of time, such that the surfaces of the particles are treated with $Mg(NO_2)^+$. The $TiO_2$ particles surface-treated with $Mg(NO_2)^+$ have zeta potential of about 25 mV.

The electrophoretic deposition process may be conducted by immersing the transparent electrode in the deionized water and/or organic solvent containing the metal oxide particles surface-treated as mentioned above, connecting the outer terminal of the transparent electrode to a cathode of DC power, connecting the anode of DC power to the opposite electrode plate, and then applying a predetermined voltage or electric field. In exemplary embodiments, the electrophoretic deposition process may be conducted at a voltage of about 100 V to about 300 V or in an electric field of about 50 V/cm to about 200 V/cm for approximately 1 min 10 mins. As external voltage is applied, the positively charged metal oxide particles flow to the transparent electrode that is connected to the cathode of the power, and are then attached to the exposed predetermined pattern on the transparent electrode. Upon electrophoretic deposition, the metal oxide particles may be easily transferred and deposited via magnetic vibration. After the completion of the electrophoretic deposition of the semiconductor layer 30, the transparent substrate is washed and then dried.

Figure 2D:
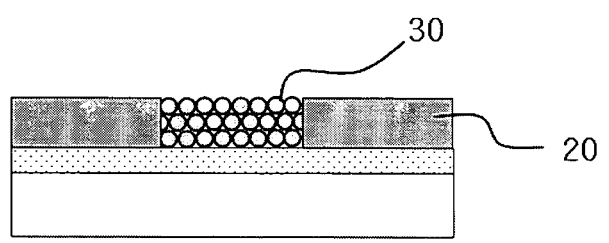

Referring to FIG. 2D, the semiconductor layer 30 formed via electrophoretic deposition may have its crystal density increased through a compression process, thus further improving the properties of the display. In one exemplary embodiment, the compression process is performed at a pressure of about 500~5000 $kg/cm^2$ for approximately 1 min to about 10 mins.

In exemplary embodiments where the semiconductor layer 30 is formed via electrophoretic deposition and then compression, a pattern having high quality may be formed using low-temperature processes, without the need for an additional burning process, unlike a general coating process.

Figure 2E:
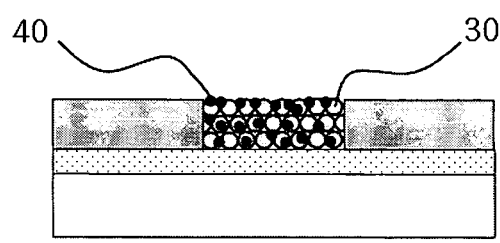

Referring to FIG. 2E, the formation of the electrochromic monolayer 40 on the semiconductor layer 30 is carried out by immersing the transparent electrode 10 having the semiconductor layer 30 formed thereon in a solution containing electrochromic material, according to any of a number of processes suitable for purpose described herein.

After the completion of the sequential formation of the insulating layer 20, the semiconductor layer 30, and the electrochromic monolayer 40 on the transparent electrode 10, the counter electrode 50 is formed to face the transparent electrode 10 according to any of a number of processes suitable for the purpose described herein, followed by supplying the electrolyte 60 between the transparent electrode 10 and the counter electrode 50, thereby obtaining the electrochromic device.

The electrolyte 60 may be supplied by various processes. In one exemplary embodiment, the surface of the transparent electrode is attached to the surface of the counter electrode, such as by using an adhesive, forming relatively fine holes through the transparent electrode and counter electrode, injecting electrolytic solution into the space between the two electrodes through the holes and sealing the outer surfaces of the holes, such as with an adhesive.

A better understanding of the present invention may be obtained in light of the following examples which are set forth to illustrate, but are not to be construed to limit the present invention.

EXAMPLE 1

On a transparent electrode formed of indium tin oxide (ITO) and polyethylene naphthalate (PEN), a negative type photosensitive insulating film (Dongjin Semichem, photosensitive insulating film for an LCD column spacer) was applied to form an insulating film so as to expose a predetermined pattern. $TiO_2$ particles having an average diameter of 25 nm were dispersed in isopropyl alcohol containing $5\times10^{-4}$ M (0.128 g/l) of $Mg(NO_3)_2 \cdot H_2O$ and 2 vol % of deionized water, thus preparing a suspension of 0.25 g/l $TiO_2$. The transparent electrode was spaced apart from a stainless steel substrate serving as an anode by an interval of 2 cm, after which current of 150 V was applied for 3 min, thus electrophoretically depositing a $TiO_2$ semiconductor layer.

The transparent electrode having the semiconductor layer formed through electrophoretic deposition was washed with isopropyl alcohol, dried at 50° C., and then pressed under a load of 5000 pounds (2270 $kg/cm^2$) for 2 min to compress the $TiO_2$ semiconductor layer. Subsequently, the transparent electrode having the semiconductor layer was immersed in an aqueous solution of 2 viologen (bis-(2-phosphonoethyl)-4,4'-bipyridinium dichloride) at room temperature for 30 min, washed with 2-propanol, and then dried, thus forming an electrochromic monolayer on the surface of the $TiO_2$.

Separately, a 100 nm thick ITO was formed on the stainless steel substrate, which was then fixed to a screen printing apparatus and thereafter printed with TiO$_2$ paste (Solaronix SAT nanoxide 300) having an average diameter of 300 nm, thus forming a reflective layer. In this process, a sieve having a mesh size of 86 μm was used. Subsequently, the substrate was heated at 70° C. for 20 min to evaporate the organic solvent, and then burned at 450° C. for 1 hour in a normal atmosphere, thus completing a counter electrode.

Thereafter, fine holes were formed through the surface of the counter electrode using a drill having a diameter of 0.75 mm in order to inject the electrolyte. The space between the two electrodes was filled with the electrolyte through the above holes, thereby manufacturing an electrochromic device. In this case, the electrolyte was composed of gamma-butyrolactone containing 0.05 M LiClO4 and 0.05 M ferrocene.

COMPARATIVE EXAMPLE 1

An electrochromic device was manufactured in the same manner as in Example 1, with the exception that the photosensitive insulating layer was not formed, a pattern was formed with nanocrystalline TiO2 paste (Solaronix, Ti-Nanoxide HT) using a screen printer, and the burning process was conducted at 150° C.

COMPARATIVE EXAMPLE 2

An electrochromic device was manufactured in the same manner as in Example 1, with the exception that the insulating film pattern was removed using a strong alkaline aqueous solution (0.1 N KOH) after deposition and compression of the TiO$_2$ nanocrystals. Thereafter, whether the insulating film was present was observed.

[Evaluation of Properties of Electrochromic Device]

In order to evaluate the electrical properties of the electrochromic device manufactured in Example 1, operation voltage ($V_{op}$) and operation current ($I_{op}$) were measured using a Keithley 2400 sourcemeter. As the voltage was gradually increased, the voltage upon saturation of chromism was determined to be the operation voltage ($V_{op}$). At this time, consumed current was determined to be the operation current ($I_{op}$).

As a result, the 30 mm×30 mm sized device sample had $V_{op}$ less than 1.5 V and $I_{op}$ of 2 mA.

In the electrochromic device manufactured in Example 1, the response speed of the 30 mm×30 mm sized transparent electrode was measured at $V_{op}$ of 1.5 V using DMS-803, available from Autronic. The period of time required for coloring was 300 msec, and the response time required for bleaching upon release of the voltage was 700 msec.

In the electrochromic device manufactured in Example 1, the contrast ratio was defined as the ratio of reflectance in a white state (after complete bleaching), as in white copy paper, to reflectance in a colored state. The white reflectance was about 60%, and the colored reflectance was about 20%, and thus the contrast ratio was 3:1, leading to high reflectance and contrast properties, and manifestation of vivid color contrast.

In order to evaluate the effect of the insulating film of the electrochromic device in Example 1, the size of each of the electrochromic device samples manufactured in Example 1 and Comparative Examples 1 and 2 was set to 30 mm×30 mm, and the $V_{op}$ and $I_{op}$ thereof were measured.

The operation voltage ($V_{op}$) and operation current ($I_{op}$) of the electrochromic device manufactured in Example 1 were measured to be 1.5 V and 2 mA, respectively, while the operation voltage ($V_{op}$) and operation current ($I_{op}$) of the electrochromic device manufactured in Comparative Example 1 were measured to be 2.5 V and 10 mA, respectively. In addition, in Comparative Example 1, in which nanocrystalline TiO$_2$ paste was burned at low temperatures, the change in color was unnatural due to severe yellowing caused by the residual organic material. The device sample manufactured in Comparative Example 2 exhibited operational properties of 1.7 V and 5 mA.

In exemplary embodiments, an electrochromic device can be manufactured into flexible display devices having excellent operational properties using low-temperature processes. The insulating film is formed on the transparent electrode, whereby the side reaction causing the reduction of cations oxidized in the counter electrode via combination with electrons injected into the transparent electrode may be reduced or effectively prevented, thus improving the operational properties of the display device.

In exemplary embodiments, a method of manufacturing an electrochromic device is provided whereby an insulating film is formed on a transparent electrode, thus improving the operational properties of the electrochromic device. Moreover, a pattern having high quality can be formed through low-temperature processes including electrophoretic deposition and compression, resulting in a flexible electrochromic device having good display properties.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flexible electrochromic device comprising:
    a flexible transparent electrode comprising a predetermined pattern;
    an insulating layer formed on a portion of the transparent electrode other than the predetermined pattern on the transparent electrode;
    a semiconductor layer formed on the predetermined pattern;
    an electrochromic monolayer formed on the semiconductor layer;
    a flexible counter electrode disposed to face the transparent electrode; and
    an electrolyte provided in a space between the transparent electrode and the counter electrode.

2. The device as set forth in claim 1, wherein the insulating layer comprises transparent photosensitive insulating material.

3. The device as set forth in claim 1, wherein the semiconductor layer comprises one of titanium oxide, zirconium oxide, strontium oxide, niobium oxide, hafnium oxide, indium oxide, tin oxide, zinc oxide and a combination including at least one of the foregoing.

4. The device as set forth in claim 1, wherein the semiconductor layer is formed via electrophoretic deposition and then compression.

5. The device as set forth in claim 4, wherein the semiconductor layer is compressed at a pressure of about 500 kg/cm$^2$ to about 5000 kg/cm$^2$.

6. The device as set forth in claim 1, wherein the semiconductor layer has a particle size of about 5 nm to about 30 nm.

7. The device as set forth in claim 1, wherein the electrochromic monolayer comprises a viologen compound derivative as an n-type electrochromic material.

8. The device as set forth in claim 1, wherein the transparent electrode comprises a transparent plastic substrate and a transparent conductive material applied thereon.

9. The device as set forth in claim 1, wherein the counter electrode comprises a metal foil and a reflective plate formed on the metal foil.

10. The device as set forth in claim 9, wherein the counter electrode further comprises a conductive material between the metal foil and the reflective plate.

11. The device as set forth in claim 9, wherein the reflective plate comprises one of titanium oxide, zirconium oxide, strontium oxide, niobium oxide, hafnium oxide, indium oxide, tin oxide, zinc oxide and a combination including at least one of the foregoing.

12. The device as set forth in claim 9, wherein the reflective plate has a particle size of about 100 nm to about 500 nm.

13. The device as set forth in claim 1, further comprising a p-type electrochromic monolayer or a redox compound on the counter electrode and/or electrolyte.

14. The device as set forth in claim 13, wherein the electrochromic monolayer comprises one of Prussian blue, phenothiazine compound derivatives, or ferrocene compound derivatives, as a p-type electrochromic compound.

15. A method of manufacturing a flexible electrochromic device, the method comprising:

forming a transparent electrode comprising a predetermined pattern;

forming an insulating layer on a portion of the transparent electrode other than the predetermined pattern to expose the predetermined pattern;

forming a semiconductor layer on the exposed predetermined pattern;

compressing the semiconductor layer;

forming an electrochromic monolayer on the semiconductor layer;

forming a counter electrode to face the transparent electrode; and providing an electrolyte between the transparent electrode and the counter electrode.

16. The method as set forth in claim 15, wherein the forming the transparent electrode comprises disposing a transparent conductive material on a transparent substrate.

17. The method as set forth in claim 15, wherein the forming an insulating layer comprises applying and processing a transparent photosensitive insulating film.

18. The method as set forth in claim 15, wherein the forming a semiconductor layer comprises electrophoretic deposition.

19. The method as set forth in claim 15, wherein the compressing of the semiconductor layer is conducted at a pressure of 500~5000 kg$_f$/cm$^2$.

20. The method as set forth in claim 15, wherein the forming the counter electrode comprises forming a reflective plate on a metal foil and disposing a conductive material between the reflective plate and the metal foil.

* * * * *